United States Patent [19]

Powers

[11] Patent Number: 5,553,902
[45] Date of Patent: Sep. 10, 1996

[54] LEAK-PROOF COUPLING

[76] Inventor: Patrick J. Powers, c/o Byron Value P.O. Box 458, Siloan Springs, Ark. 72761

[21] Appl. No.: 274,294

[22] Filed: Jul. 12, 1994

[51] Int. Cl.⁶ .................................................. F16L 17/06
[52] U.S. Cl. ...................... 285/350; 285/331; 285/354; 285/351; 285/906
[58] Field of Search ................................... 285/331, 351, 285/350, 354, 906

[56] References Cited

U.S. PATENT DOCUMENTS

| 648,232 | 4/1900 | Brandt | 285/331 |
|---|---|---|---|
| 1,504,363 | 8/1924 | Madigan | 285/331 X |
| 1,638,224 | 8/1927 | Vandergrift | 285/331 X |
| 1,663,755 | 3/1928 | Gammeter | 285/331 X |
| 1,848,307 | 3/1932 | Boynton | 285/331 X |
| 2,050,137 | 8/1936 | Walsh | 285/331 |
| 2,330,864 | 10/1943 | Bruno | 285/331 X |
| 2,343,235 | 2/1944 | Bashark | 285/350 X |
| 2,688,497 | 9/1954 | Brisack | 285/350 X |
| 2,726,104 | 12/1955 | Boitnott et al. | 285/331 X |
| 5,131,695 | 7/1992 | Wiser | 285/354 |

FOREIGN PATENT DOCUMENTS 809979  8/1951  Germany ................................ 285/331

Primary Examiner—Dave W. Arola
Attorney, Agent, or Firm—David H. Judson

[57] ABSTRACT

A coupling is provided which is particularly suitable for refrigeration service and air conditioning systems. The coupling includes a body portion, an adapter portion, a collar and a gasket. The body and adapter portions are connected to two conduits or the like containing fluid therein. The adapter has a sealing channel formed therein while the body portion has a mating piece attached thereto. The mating piece is positioned to be received in a predetermined spaced relation with respect to the sealing channel of the adapter. The gasket is disposed within a sealing channel formed by the body and adapter portions. The collar is rotatable and connects the body portion to the adapter portion, thereby compressing the gasket within the sealing channel. The coupling is also provided with a second sealing channel for additional sealing.

1 Claim, 3 Drawing Sheets

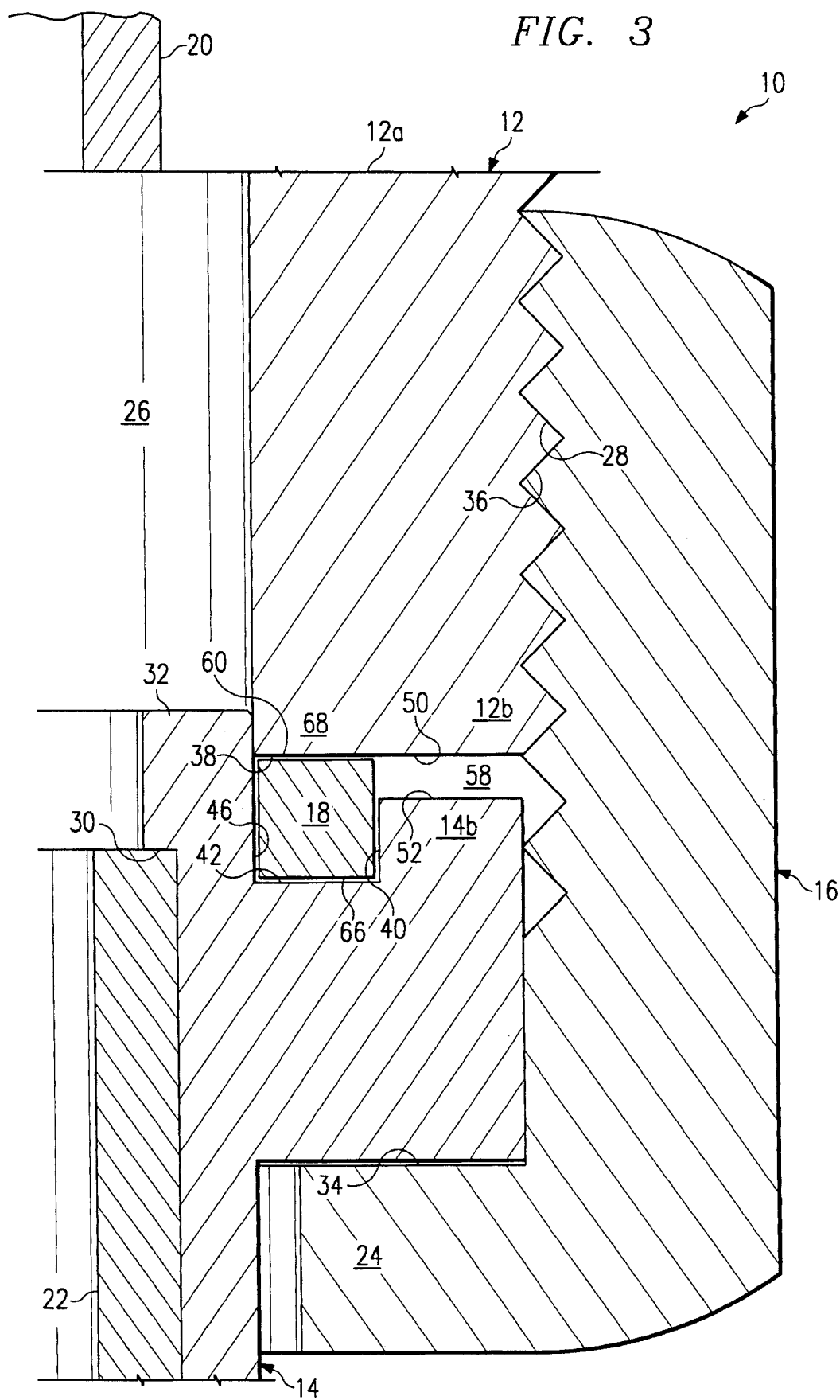

LEAK-PROOF COUPLING

TECHNICAL FIELD

The present invention relates generally to couplings for sealably joining the ends of two conduits and more specifically to a leak-proof coupling for use in connecting conduits and the like for use in connection with refrigeration systems and air conditioning systems.

BACKGROUND OF THE INVENTION

Refrigeration systems, which include many components, are well-known in the prior art. Typically, the components are connected together such that the circulating refrigerant is sealed and separated from the surrounding environment. Refrigerants, such as freon, are expensive, hazardous to the environment, and are often toxic. It is therefore important that the refrigeration system be properly sealed in order to contain the refrigerant.

Sealing of refrigeration systems has heretofore been difficult where a number of operations occur simultaneously. For instance, often several components operate at high and low temperatures during the same time periods. Additionally, operations frequently occur under high pressures, vacuums and vibrations and proper sealing of the :system becomes critical.

Connections or unions for use in connection with plumbing and the like are also well-known in the prior ark. These connections often utilize a rotatable collar to connect the ends of conduits. Under these circumstances, the ends of the conduits have been previously equipped to be fitted with the collar. The typical connection may be reused by connecting and disconnecting the collar in a rotatable manner.

For example, U.S. Pat. Nos. 2,934,915 and 3,091,945 relate to couplings for use with refrigeration service. These couplings are capable of withstanding heat, cold, pressure, vacuum, vibration and exposure to refrigerant. However, such couplings have several disadvantages. The components are expensive to produce. In addition, a plastic ring in the coupling is susceptible to damage. Consequently, leaks sometimes occur which require disassembling the union and replacing the ring. Disassembling the union is inefficient, often results in a loss of refrigerant and is thus costly.

An improved coupling is shown in U.S. Pat. No. 5,131,695 to Wiser. Wiser provides a reusable union coupling having two fittings, a body, and an adapter, which are attached to the two conduits or other components to be joined. A variable washer cavity, which was previously known in the art, is created when the body and adapter are mated, within which a polytetrafluoroethylene (TEFLON) washer is disposed. A collar is provided for moveably connecting the body to the adapter and selectively compressing the washer within the cavity.

It would therefore be desirable to provide a coupling which alleviates the disadvantages of the prior art.

BRIEF SUMMARY OF THE INVENTION

It is an object of the present invention to provide a coupling which is simple to use and which is cost efficient to manufacture.

It is another object of the present invention to provide a coupling which has a high resistance to leaking and the like.

It is a further object of the present invention to provide a coupling which compresses the gasket to form a seal in both the horizontal and vertical directions.

It is yet a further object of the present invention to provide a body having an O-ring type flange or stepped-type flange to improve sealing characteristics.

The coupling of the present invention is particularly well-suited for use in connection with refrigeration system components. The coupling primarily includes a body portion, an adapter portion, a collar portion and a gasket. The body and the adapter are connected to the components or elements to be attached thereto. Typically, the elements will be conduits or the like. The body and adapter have complementary sealing grooves, with sealing surfaces generally perpendicular to the axis of the assembly. The sealing surface on the body corresponds with and faces the sealing surface on the adapter.

A gasket is compressed between the sealing surfaces to effectuate a leak-proof seal. Each groove also has a cylindrical retention surface generally perpendicular to the corresponding sealing surface. In a preferred embodiment, the body retention surface faces inwardly and is adjacent to the outside edge of the body sealing surface, and the adapter retention surface faces outwardly and is adjacent to the inside edge of the adapter sealing surface. When the body and adapter are joined, the surfaces form an adjustable sealing channel. Preferably, the sealing channel is annular. A gasket is placed within the channel and held in place by the channel walls or surfaces.

A collar is included to connect the body and adapter in the proper position to compress the gasket and form a leak-tight seal. In a preferred embodiment, the collar includes an internally extending ring which engages the shoulder on the adapter while the collar is rotated to engage its internal threads with external threads on the body. As the collar rotates further, the sealing grooves engage and the sealing surfaces approach one another. The collar is usually sufficiently tightened by hand without the use of tools to provide a leak-proof connection, but it may be tightened further with tools to provide a more secure connection.

A flange is formed as an integral part of either the body portion, adapter portion or both portions. Preferably, the flange is formed on the adapter portion and is an O-ring type flange which allows compression of the gasket by the body portion. As discussed herein, the flange may formed in a variety of configurations and heights:. The O-ring type flange provides improved sealing both horizontally as well as vertically.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 illustrates an alternative embodiment of the present invention in which an enlarged cross-sectional view of the sealing portion of the coupling is illustrated.

Similar reference characters refer to similar parts throughout the several views of the drawings.

DETAILED DESCRIPTION

Figure 1:
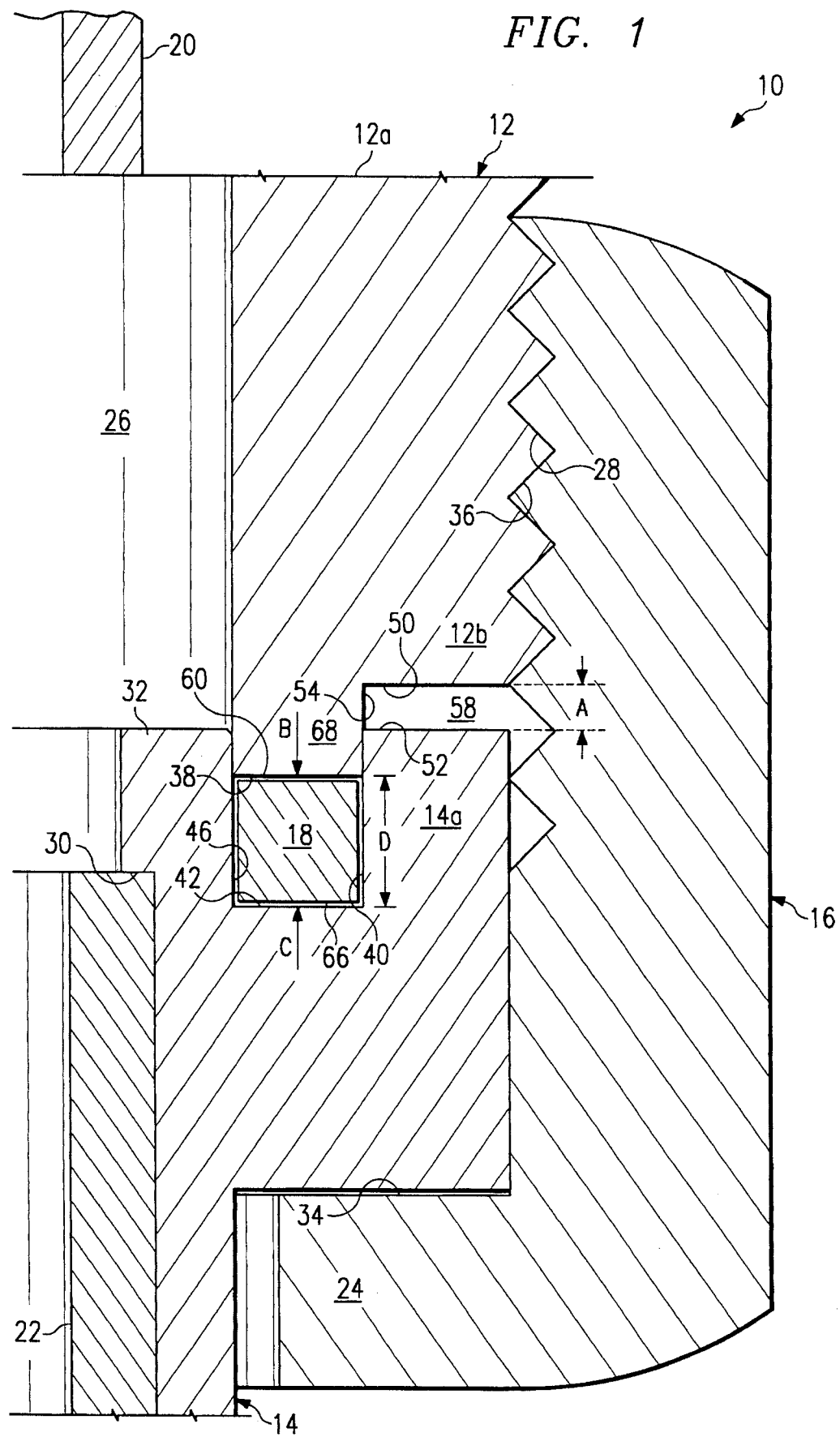
FIG. 1 is an enlarged cross-sectional view illustrating the sealing portion of the coupling in accordance with the present invention.

Referring now to FIG. 1, a coupling 10 includes a body portion 12, adapter portion 14, collar 16 and gasket 18. Preferably, the coupling 10 is reusable. The body 12, adapter 14, collar 16 and gasket 18 removably and sealably connect a first conduit 20 to a second conduit 22. First and second conduits 20, 22 may be formed in a variety of configurations. In a preferred embodiment, however, first conduit 20 and second conduit 22 are cylindrical and capable of transporting fluids therethrough. Conduits 20, 22 are positioned substantially parallel and coaxial with respect to one another for connecting. The first end 12a of body portion 12 is fitted to the end of first conduit 20 while adapter 14 is fitted to the end of second conduit 22. While not meant to be limiting, the fittings may be accomplished by slidably inserting the respective conduits into the body and the adapter portions and soldering the conduits in place. Consequently, the conduits 20, 22 are permanently attached to and sealed together with body 12 and adapter 14. It should be noted that any method of joining the body and adapter to the conduits is suitable in accordance with the present invention so long as a leak-proof seal is thereby formed. For example, body portion 12 and adapter portion 14 may be connected to conduits 20, 22 by threading the components respectively.

Leading end 32 of adapter 14 is shown in FIG. 1 with a small inwardly facing lip 30 which functions to position second conduit 22 into adapter portion 14. Body portion 12 includes a central channel 26 which allows fluid to pass therethrough when the coupling is in use. In a preferred embodiment, channel 26 is cylindrical.

As further illustrated in FIG. 1, adapter portion 14 is held to body portion 12 by collar 16. Preferably, collar 16 includes an inwardly facing flange ring 24 at one end and threads 28 at the opposite end of the collar 16. Flange ring 24 is used to engage collar retaining surface 34 of adapter portion 14 and is rotatable with respect thereto while collar threads 28 are used to engage body threads 36. As collar 16 is rotated, adapter portion 14 is aligned with body portion 12 and leading end 32 of adapter portion 14 engages channel 26 of body portion 12. As collar 16 is rotated further, the desired axial position of adapter portion 14 with respect to body portion 12 is obtained.

While not meant to be limiting, body portion 12, adapter portion 14 and collar 16 may be formed of brass. However, it should be understood that any material which is capable of forming a leak-proof seal and carrying fluid therethrough under various operating conditions is suitable for use in accordance with the present invention.

Still referring to FIG. 1, adapter portion 14 includes an enclosed sealing channel 66 while body portion includes a mating piece 68 positioned at a second end of the body 12 and adapted to be received in the sealing channel 66. Sealing channel 66 is defined by surfaces 40, 42 and 46, which are part of adapter 14. In this manner, surfaces 40, 42 and 46 form a generally U-shaped configuration.

Mating piece 68 has an end portion 60 which is a flat surface as shown in FIG. 1. While not meant to be limiting, end portion 60 of mating piece 68 may be formed in any of the configurations shown in FIGS. 2A–2F. Additionally, the bottom portion of the generally U-shaped configuration or surface 42 may have a mating piece positioned thereon. Such mating piece may also be formed in any of the configurations shown in FIGS. 2A–2F. In yet another embodiment, the body portion may have a generally inverted U-shaped configuration while the adapter portion does not have the U-shaped configuration. In this embodiment, the adapter portion will have a mating piece formed thereon. Preferably, the mating piece will have a configuration such as that illustrated in FIGS. 2A–2F.

Body 12 also includes a groove that receives the outer end of the adapter. Sealing surfaces 38 and 42 extend perpendicular to the longitudinal axis of coupling 10, and in substantially opposed, parallel and spaced relationship with respect to one another.

Surface 40 faces inward while surface 46 faces outward and extends from the upper portion of adapter 14. Preferably, surfaces 40 and 46 are cylindrical. When leading end 32 of adapter 14 is inserted into channel 26 of body portion 12, surfaces 38, 40, 42 and 46 create a sealing channel 66. Gasket 18 is designed to be positioned within sealing channel 66. Gasket 18 may be varied in length D by moving end portion 60 of body portion 12 coaxially with respect to adapter portion 14. In this manner, gasket 18 may be compressed or extended within sealing channel 66. In a preferred embodiment, sealing channel 66 is annular and has a square or rectangular cross section.

FIG. 1 further illustrates the relative position of the components with gasket 18 in place but not significantly compressed, such that distance D is at or close to its maximum distance. End portion 60 of mating piece 68 allows compression of gasket 18 by body portion 12 in the direction of arrow B by adapter 14 moving in the direction of arrow C. Further compression may cause gasket 18 to expand or deflect into second sealing area 58.

Preferably, body portion 12 and leg portion 14a of adapter portion 14 are positioned such that second sealing area 58 is formed therebetween. Sealing area 58 is formed by surface 50 which forms part of the second end 12b of body portion 12, surface 54 which extends from the side of mating piece 68 and surface 52 which forms the top portion of leg 14a. As discussed above, when end portion 60 of mating piece 68 compresses in the direction of arrow 28, a portion of gasket 18 may be deflected and forced into second sealing area 58. Additional sealing is thus provided by second sealing area 58.

Figure 2A:
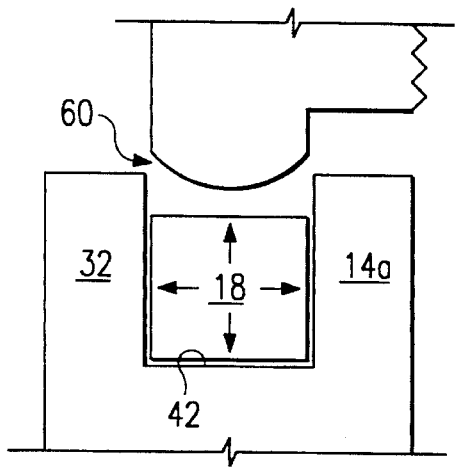
FIGS. 2A–2F are alternative embodiments of the mating piece of the body or the O-ring type flange which are suitable for use according to the present invention.
Figure 2B:
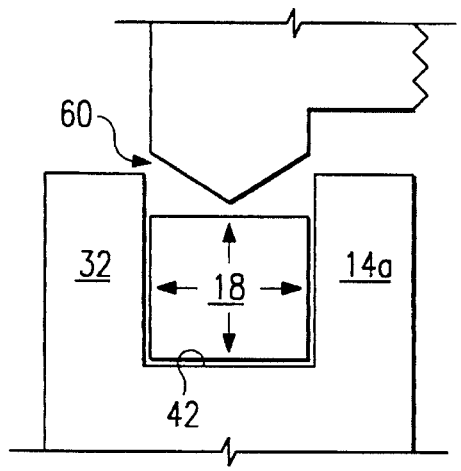
Figure 2C:
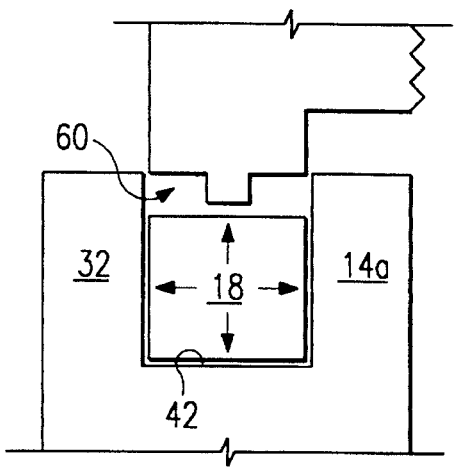
Figure 2D:
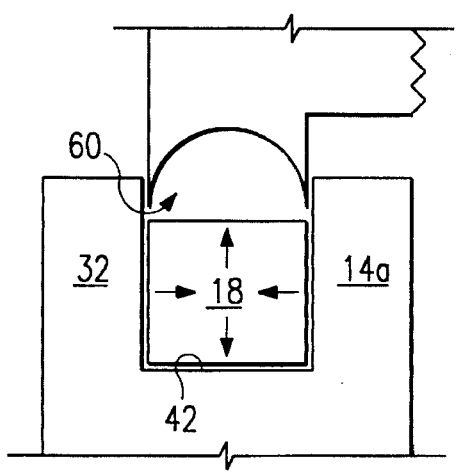
Figure 2E:
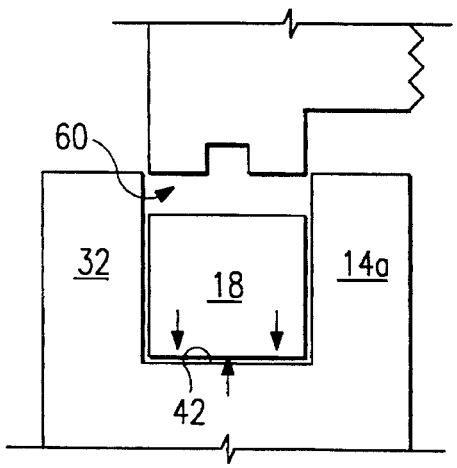

As mentioned above, FIGS. 2A–2F illustrate alternative embodiments for end portion 60 of mating piece 68. For example, surface 60 may be curved as shown in FIG. 2A. Alternatively, surface 60 may be formed in an inverted knifed or pointed configuration as shown in FIG. 2B. In yet another embodiment, surface 60 may be formed in a stepped or inverted stepped configuration as shown in FIGS. 2C and 2E, respectively. FIG. 2D illustrates yet another configuration of end portion 60. End portion 60 in this configuration curves inwardly in a direction opposite that shown in FIG. 2A.

Figure 2F:
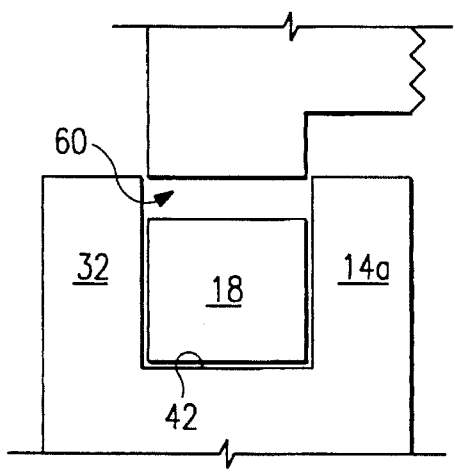

FIG. 2F illustrates surface or end portion 60 and surface 42. Surfaces 60 and/or 42 may be formed in any of the configurations shown in FIGS. 2A–2E. Alternatively, surfaces 60 and/or 42 may be formed in any other configuration or contour not shown in FIGS. 2A–2E so long as the pressure points exerted on gasket 18 are varied. Additionally, surfaces 60 and/or 42 may be flat as illustrated in FIG. 1.

Referring now to FIG. 3, an alternative embodiment of the present invention is shown. The embodiment shown in FIG. 3 is similar to that shown in FIG. 1 except that leg 14b of adapter portion 14 is of unequal length to that of leg 14a of adapter portion 14 shown in FIG. 1. When gasket 18 is compressed, a portion of the gasket may be deflected and forced into second sealing area 58, thereby providing additional sealing.

Gasket 18 may generally be constructed of any suitable material. However, as disclosed in U.S. Pat. No. 5,131,695, polytetrafluoroethylene (TEFLON) is a preferred material of construction due to its high temperature resistance and its resistance to many refrigerants and oils.

The coupling of the present invention provides distinct advantages over the prior art. For example, couplings of the present invention allow compression of the gasket in such a manner that sealing occurs in the horizontal direction as well as in the vertical direction, thereby insuring that leak-proof sealing is obtained. Additional sealing is provided by a second sealing area to further enhance the sealing characteristics.

It should be appreciated by those skilled in the art that the specific embodiments disclose above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A coupling comprising:

a first portion having first and second ends, the first end having a longitudinal channel defined between an outer and an inner wall, the outer wall of the longitudinal channel being lower than the inner wall of the longitudinal channel;

a gasket positioned within the longitudinal channel;

a second portion having first and second ends, the first end engaging the gasket within the longitudinal channel of the first portion, said engagement forming a first sealing area between the bottom of the longitudinal channel and the first end of the second portion and a second sealing area between the outer wall of the longitudinal channel and the first end of the second portion;

a collar for connecting the first and the second portions; and wherein the gasket positioned within the first sealing area deforms into the second sealing area when compressed between the bottom of the longitudinal channel and the first end of the second portion.

\* \* \* \* \*